United States Patent [19]

Hartz

[11] Patent Number: 4,548,306

[45] Date of Patent: Oct. 22, 1985

[54] PLATE SEPARATOR

[75] Inventor: James F. Hartz, Indianapolis, Ind.

[73] Assignee: General Motors Corporation, Detroit, Mich.

[21] Appl. No.: 605,246

[22] Filed: Apr. 30, 1984

[51] Int. Cl.⁴ .............................................. F16D 13/52
[52] U.S. Cl. .................................. 192/70.28; 188/723
[58] Field of Search ...................... 192/70.28; 188/72.3

[56] References Cited

U.S. PATENT DOCUMENTS

| 2,174,240 | 9/1939 | Glenny | 192/69 |
| 2,199,801 | 5/1940 | Kattwinkel | 192/70.28 |
| 2,217,357 | 10/1940 | Coe | 192/70.28 |
| 2,226,309 | 12/1940 | Gleasman | 192/70.28 |
| 3,171,522 | 3/1965 | Petrie et al. | 192/69 |
| 3,249,189 | 5/1966 | Schjolin et al. | 192/70.28 |
| 3,486,588 | 12/1969 | Grego | 192/70.28 X |
| 3,584,720 | 6/1971 | Park et al. | 192/70.28 |
| 3,613,848 | 10/1971 | Reiff | 192/70.28 |
| 3,747,729 | 7/1973 | Storer, Jr. | 192/70.28 |
| 4,144,955 | 3/1979 | Garnier | 192/70.28 |

FOREIGN PATENT DOCUMENTS

| 646120 | 6/1937 | Fed. Rep. of Germany | 192/70.28 |
| 1903360 | 7/1970 | Fed. Rep. of Germany | 192/70.28 |
| 2316571 | 10/1973 | Fed. Rep. of Germany | 192/70.28 |
| 446143 | 3/1949 | Italy | 192/70.28 |
| 691317 | 5/1953 | United Kingdom | 192/70.28 |

*Primary Examiner*—Alan Cohan
*Assistant Examiner*—John A. Rivell
*Attorney, Agent, or Firm*—Saul Schwartz

[57] ABSTRACT

A plate separator for a multiplate clutch includes a circular spine and integral bifurcations extending in opposite directions from the spine. The plate separator is disposed in an annulus defined by a pair of outer friction plates and an interposed inner friction plate. When the outer friction plates clamp the inner friction plate, the bifurcations flex at their junctures with the spine. When the inner friction plate is released, the bifurcations unflex to separate the outer plates from the inner plate.

3 Claims, 6 Drawing Figures

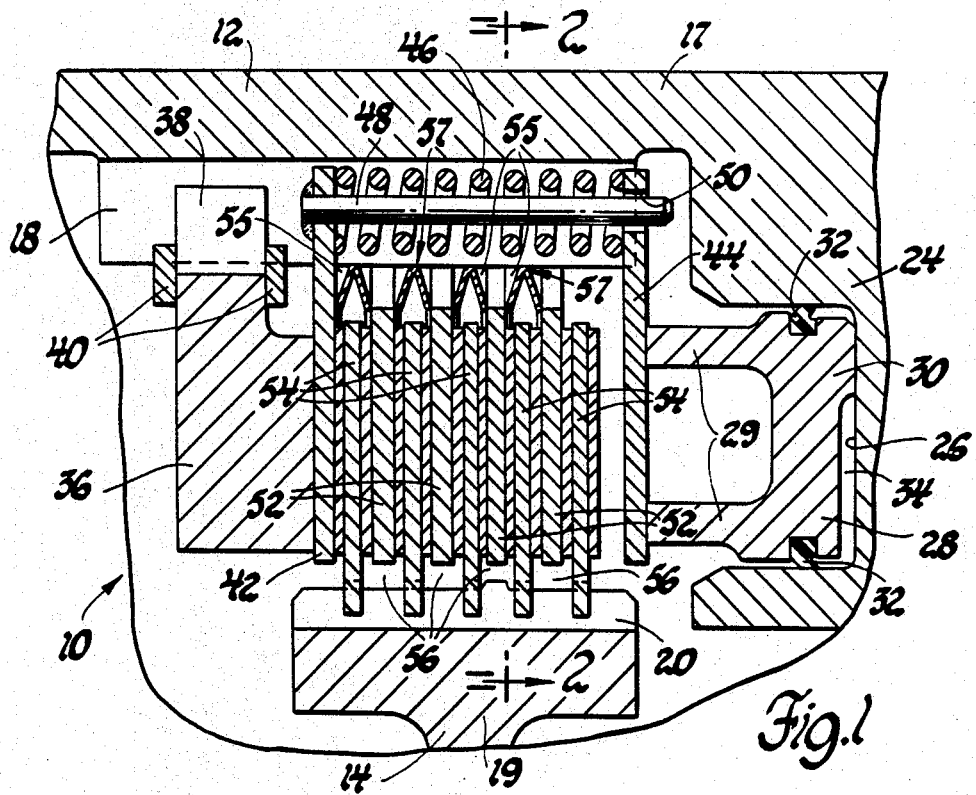
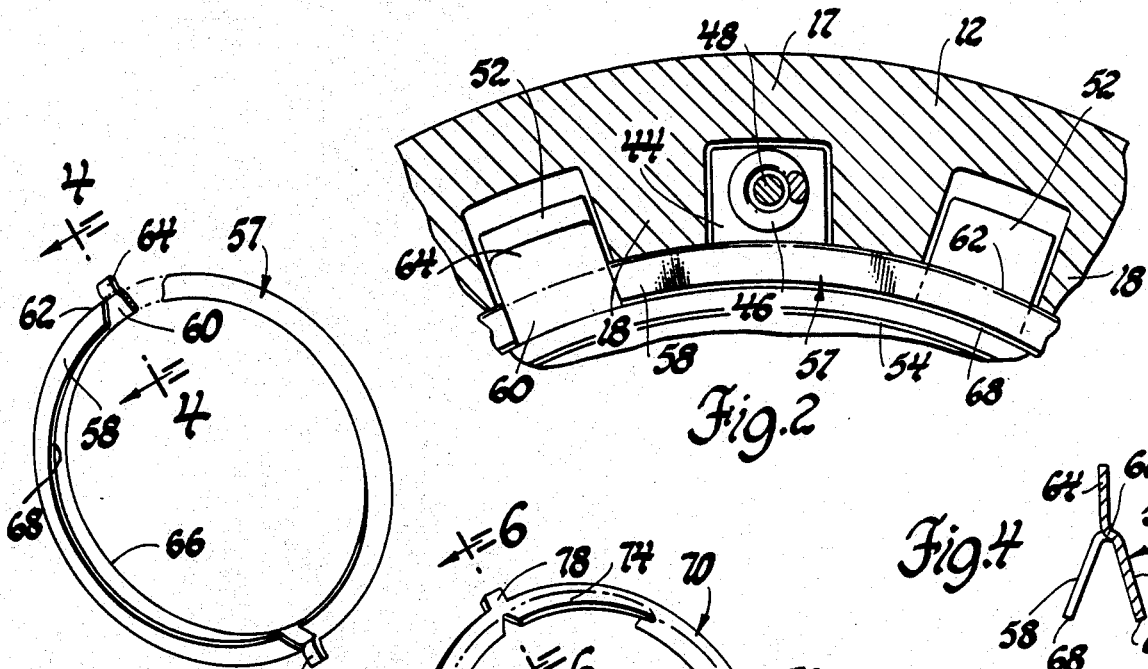
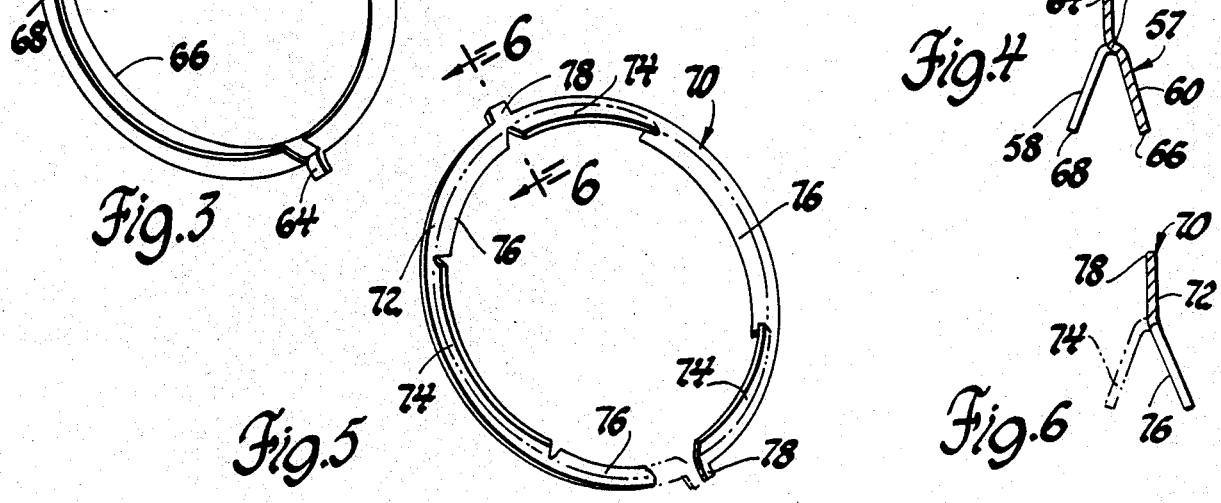

PLATE SEPARATOR

The invention herein described was made in the course of work under a contract or subcontract thereunder with the Department of Defense.

BACKGROUND OF THE INVENTION

1. Field of the Invention

This invention relates generally to multiple plate clutches and, more particularly, to a novel plate separator for preventing frictional drag between relatively rotating plates of the clutch.

2. Description of the Prior Art

In multiple plate clutches, friction plates on one member rotate relative to interposed friction plates on another member when the clutch is disengaged. To reduce frictional drag between relatively rotating plates when the clutch is disengaged, spring devices which positively separate the plates have been proposed. In some arrangements, predetermined angular relationships must be maintained between the spring devices and the friction plates. In another arrangement, annular wave springs are disposed between the friction plates to effect plate separation and are keyed to an appropriate one of the relatively rotating members. And in still another arrangement for a single disc-type clutch, a plurality of dished washers are aligned in a stack to shift the disc to a centered position between pressure plate surfaces when the clutch is disengaged. A plate separator according to this invention is simple to install and manufacture and represents a novel alternative to these and other known plate separators.

BRIEF DESCRIPTION OF THE INVENTION

Accordingly, the primary feature of this invention is that it provides a novel plate separator which reduces frictional drag in a disengaged multiplate clutch. Another feature of this invention is that it provides a novel plate separator in the form of a unitary ring between adjacent plates on one of the relatively rotating members having a circular spine extending through 360° and oppositely extending bifurcations integral with the spine, the bifurcations being engaged by the friction plates and resiliently flexed when the clutch is engaged and thereafter unflexing to separate the plates. Yet another feature of this invention resides in the provision in the novel plate separator of a pair of bifurcations each integral with the spine and projecting therefrom in opposite axial directions and extending through substantially 360°. Still another feature of this invention resides in the provision in a modified embodiment of the novel plate separator of a spine in the form of a circular flange and integral bifurcations in the form of arc segments of the flange splayed alternately in opposite axial directions from the plane of the flange.

These and other features of this invention will be readily apparent from the following specification and from the drawings wherein:

FIG. 1 is a fragmentary elevational view of a multiplate clutch including a plurality of plate separators according to this invention;

FIG. 2 is an enlarged fragmentary sectional view taken generally along the plane indicated by lines 2—2 in FIG. 1;

FIG. 3 is a partially broken away perspective view of a plate separator according to this invention;

FIG. 4 is a sectional view taken generally along the plane indicated by lines 4—4 in FIG. 3;

FIG. 5 is similar to FIG. 3 but showing a modified plate separator according to this invention; and FIG. 6 is a sectional view taken generally along the plane indicated by lines 6—6 in FIG. 5.

Referring now to FIG. 1 of the drawings, a clutch 10 includes a first member 12 and a second member 14. The first and second members 12 and 14 are rotatable relative to each other about a longitudinal axis of the clutch which axis may, for example, coincide with the longitudinal axis of a multispeed power transmission. It is understood, of course, that clutch 10 might instead be a brake, in which event one of the first and second members 12 and 14 would be stationary relative to a supporting structure, such as a transmission housing. The first member 12 has a drum portion 17 in which are formed a plurality of axial internal splines 18, and the second member 14 has a hub portion 19 on which are formed a plurality of axial external splines 20. The first member 12 further includes a radially inwardly extending flange 24 integral with drum portion 17 in which is formed an annular groove 26.

The clutch 10 further includes an annular piston 28 having a pair of annular flanges 29 which might be segmented if desired and an annular ridge 30 which might also be a plurality of raised stops. The piston 28 is slidably disposed in the annular groove 26 and cooperates with the closed end of the latter and with a pair of annular seals 32 on the piston in defining a pressure chamber 34 adapted to be supplied with pressurized fluid from a pump, not shown. The ridge 30 engages the closed end of the groove 26 to define a minimum volume for the chamber 34 when the piston assumes a fully retracted position, FIG. 1, in the groove.

The clutch 10 further includes an annular backing plate 36 having a plurality of external splines 38 slidably received between the internal splines 18 on the first member 12 whereby the backing plate is nonrotatably supported on the first member. A pair of retaining rings 40 are disposed on opposite sides of the backing plate 36 in appropriate grooves in the first member 12 and function to prevent axial bodily shiftable movement of the backing plate relative to the first member.

A pair of annular end plates 42 and 44 adjacent, respectively, the backing plate and the piston, have axial grooves around their circumferences which receive the internal splines 18 on the first member 12 whereby the end plates are slidably but nonrotatably supported on the first member. A coil spring 46, representative of a plurality of piston return springs which may be arrayed around the longitudinal axis, is disposed between the end plates 42 and 44 and between adjacent ones of a pair of the internal splines 18. A guide pin 48 attached to end plate 42 retains the spring 46 and projects through an appropriate clearance aperture 50 in the end plate 44. The springs represented by spring 46 separate the end plates 42 and 44 and, consequently, urge the piston toward the retracted position.

A plurality of annular outer friction plates 52 are disposed between the end plates 42 and 44 and have appropriate axial grooves around their outer circumferences which receive the internal splines 18 on the first member 12 whereby the outer friction plates are nonrotatably supported on the first member 12 for axial bodily shiftable movement. Interposed between the outer friction plates 52 and the end plates 42 and 44 are a plurality of annular inner friction plates 54 having appropriate internal grooves which slidably receive the external splines 20 on the second member 14 whereby the inner friction plates 54 are nonrotatably supported on the second member 14 for axial bodily shiftable movement. Adjacent ones of the outer plates 52 and the interposed one of the inner plates 54 cooperate in defining outer annuli 55 inboard of the internal splines 18. Adjacent ones of the inner plates 54 and the interposed one of the outer plates 52 cooperate in defining inner annuli 56 outboard of the external splines 20.

Briefly, the clutch is engaged by introduction of pressurized fluid to the chamber 34 which shifts the piston 28 to the left, FIG. 1, to compress the stack of outer and inner friction plates 52 and 54, respectively, between the end plates 42 and 44 and between the piston 28 and the backing plate 36. As the pressure chamber 34 transitions from exhausted to fully pressurized, the force compressing the friction plates increases until relative rotation between the outer plates 52 and the inner plates 54 ceases and the first and second members 12 and 14 are rigidly connected. The clutch 10 is disengaged when the pressure chamber 34 is exhausted and the springs represented by spring 46 separate the end plates 42 and 44 and force the piston 28 to the retracted position. To reduce drag between adjacent ones of the plates disposed on the first member 12 and the interposed one of the plates disposed on the second member 14, a plurality of plate separators 57 are disposed in respective ones of the outer annuli 55.

Referring to FIGS. 1 through 4 and describing a representative one of the plate separators 57, the latter is a unitary ring having a pair of bifurcations 58 and 60 integral with a circular spine 62. The bifurcations 58 and 60 extend generally 360° around the axis 16 so that at substantially any transverse cross section around the plate separator the bifurcations define an inverted V with the spine 62 at the apex thereof, FIG. 4. The representative plate separator 57 further includes a pair of diametrically opposed, radially outwardly extending tabs 64 integral with the spine 62 and the bifurcations 58 and 60. The tabs 64 correspond in shape to the grooves between the internal splines 18 so that when the plate separators 57 are installed in the outer annuli 55, the tabs are slidably received between the splines. Accordingly, the plate separators 57 are nonrotatably supported on the first member 12 for axial bodily shiftable movement.

The bifurcation 60 has a circular inner edge 66, and the bifurcation 58 likewise has a substantially circular inner edge 68 interrupted only where tabs 64 are bent radially outward. In an unstressed or normal condition of the plate separator, the edges 66 and 68 are axially spaced a distance exceeding the thickness of the inner friction plates 54 so that when the clutch 10 is engaged, the bifurcations are captured between adjacent ones of the outer friction plates 52 and flexed thereby generally at the junctures between the spine 62 and the bifurcations 58 and 60. When the clutch is then subsequently disengaged, the bifurcations 58 and 60 unflex or spring back to their original or unstressed positions, automatically spacing each of the outer friction plates from the adjacent outer friction plates a distance sufficient to separate the outer plates from the inner plates.

Referring particularly now to FIGS. 5 and 6, a modified plate separator 70 corresponding functionally to the plate separators 57 includes a circular spine 72 in the form of an annular flange adapted for disposition in a plane generally perpendicular to the axis of rotation of the first member 12 relative to the second member 14.

Integral with the spine 72 are a plurality of bifurcations 74 representing arc segments of the circle defined by the spine and splayed or projecting to one side of the plane of the spine. Also integral with the spine 72 are a plurality of bifurcations 76 representing arc segments of the circle defined by the spine and splayed or projecting to the opposite side of the plane of the spine from the bifurcations 74. The bifurcations 74 and 76 are spaced alternately around the spine. The plate separator 70 further includes a pair of diametrically opposed, radially outwardly extending tabs 78 integral with spine 72 and corresponding in shape to the grooves between the internal splines 18 on the first member 12. When a plurality of plate separators 70 are disposed in the outer annuli 55 and the bifurcations 74 and 76 are unstressed, the axial spacing between the edges of the bifurcations exceeds the thickness of the inner friction plates 54 so that when the clutch is engaged the bifurcations are flexed by the adjacent ones of the outer plates 52 about their junctures with the spine 72. When the clutch 10 is disengaged, the bifurcations unflex or spring back to their unstressed positions, thereby separating the outer plates 52 by distances sufficient to minimize drag between the inner and the outer friction plates.

While the plate separators 57 and 70 have been illustrated in the outer annuli 55, it will be apparent that similar plate separators could be disposed in the inner annuli 56. It will likewise be apparent that the plate separators 57 and 70, when properly dimensioned, can replace the return springs represented by spring 46 between the end plates 42 and 44.

The embodiments of the invention for which an exclusive property or privilege is claimed are defined as follows:

1. In a clutch having a pair of outer friction plates supported on a first member of said clutch for bodily shiftable movement along an axis of said clutch, an inner friction plate between said outer friction plates supported on a second member of said clutch rotatable on said axis relative to said first member, said inner friction plate cooperating with said outer friction plates in defining an outer annulus around said axis, and pressure means selectively operable to compress and clamp said inner friction plate between said outer friction plates thereby to rigidly connect said first and said second members, a unitary plate separator in said annulus comprising, a circular spine extending 360° around said axis and disposed in a transverse plane perpendicular thereto, means defining a first bifurcation integral with said spine and projecting to one side of said transverse plane, means defining a second bifurcation integral with said spine and projecting to the other side of said transverse plane, each of said bifurcations having an end engageable by an adjacent one of said outer friction plates when said pressure means clamps said inner friction plate between said outer friction plates whereby said bifurcations are resiliently flexed generally at their junctures with said spine, each of said bifurcations thereafter unflexing to space apart said outer friction plates a distance exceeding the thickness of said inner friction plate, means defining a radially extending tab on said plate separator integral with said spine, and slot means on said first member operative to slidably receive said tab whereby relative rotation between said plate separator and said first member is foreclosed.

2. The plate separator recited in claim 1 wherein each of said first and said second bifurcations extends substantially 360° around said axis so that said first and said second bifurcations cooperate with said spine in defining an inverted V in transverse cross section.

3. The plate separator recited in claim 1 wherein said spine is an annular flange disposed in said transverse plane and each of said first and said second bifurcations is an arc segment of said flange splayed at an angle to said transverse plane and on opposite sides thereof.

* * * * *